No. 671,237. Patented Apr. 2, 1901.
W. RUBIN.
CAN FORMING AND SOLDERING MACHINE.
(Application filed May 28, 1900.)
(No Model.) 3 Sheets—Sheet 1.
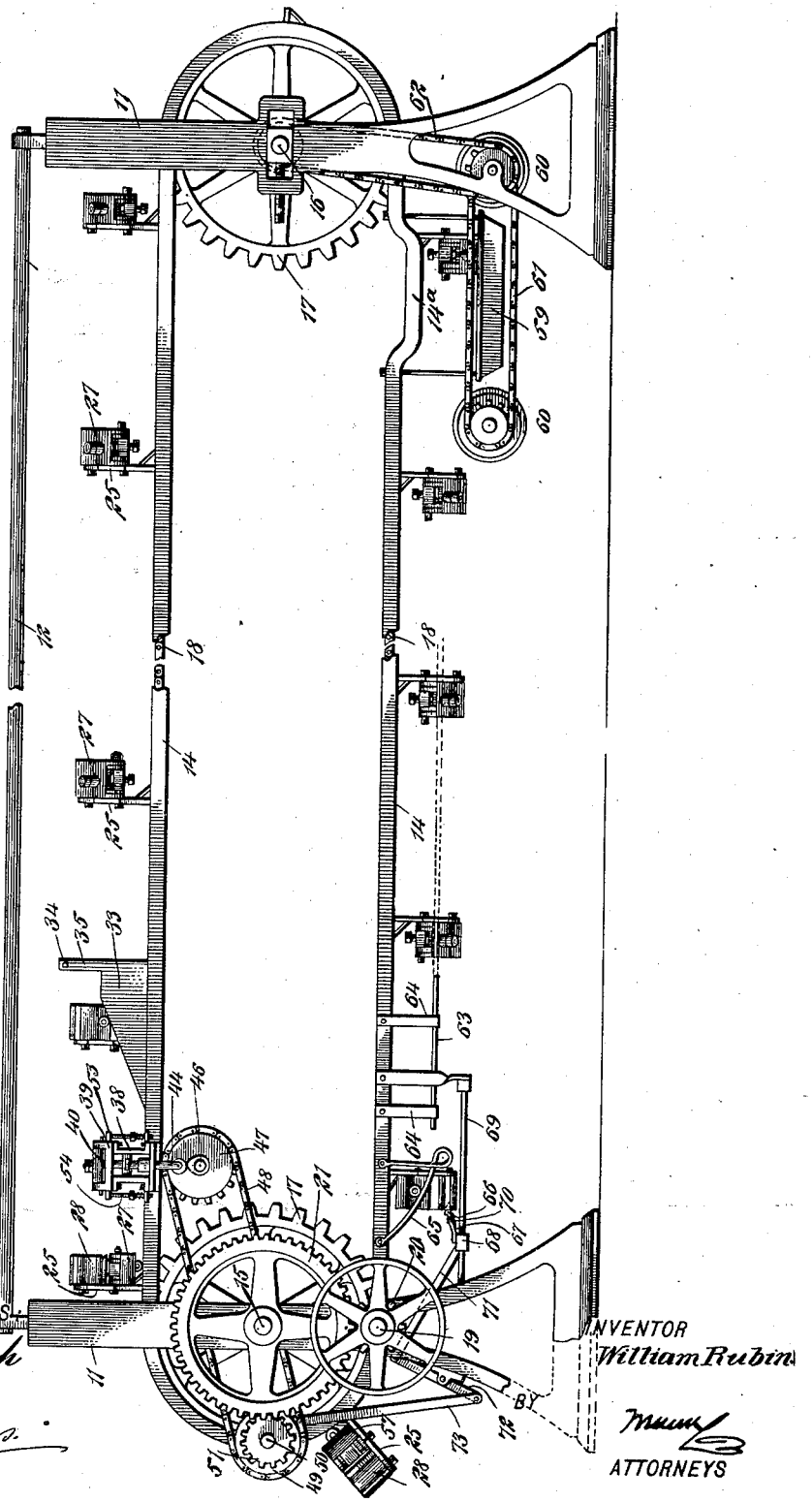
WITNESSES
INVENTOR
William Rubin
ATTORNEYS

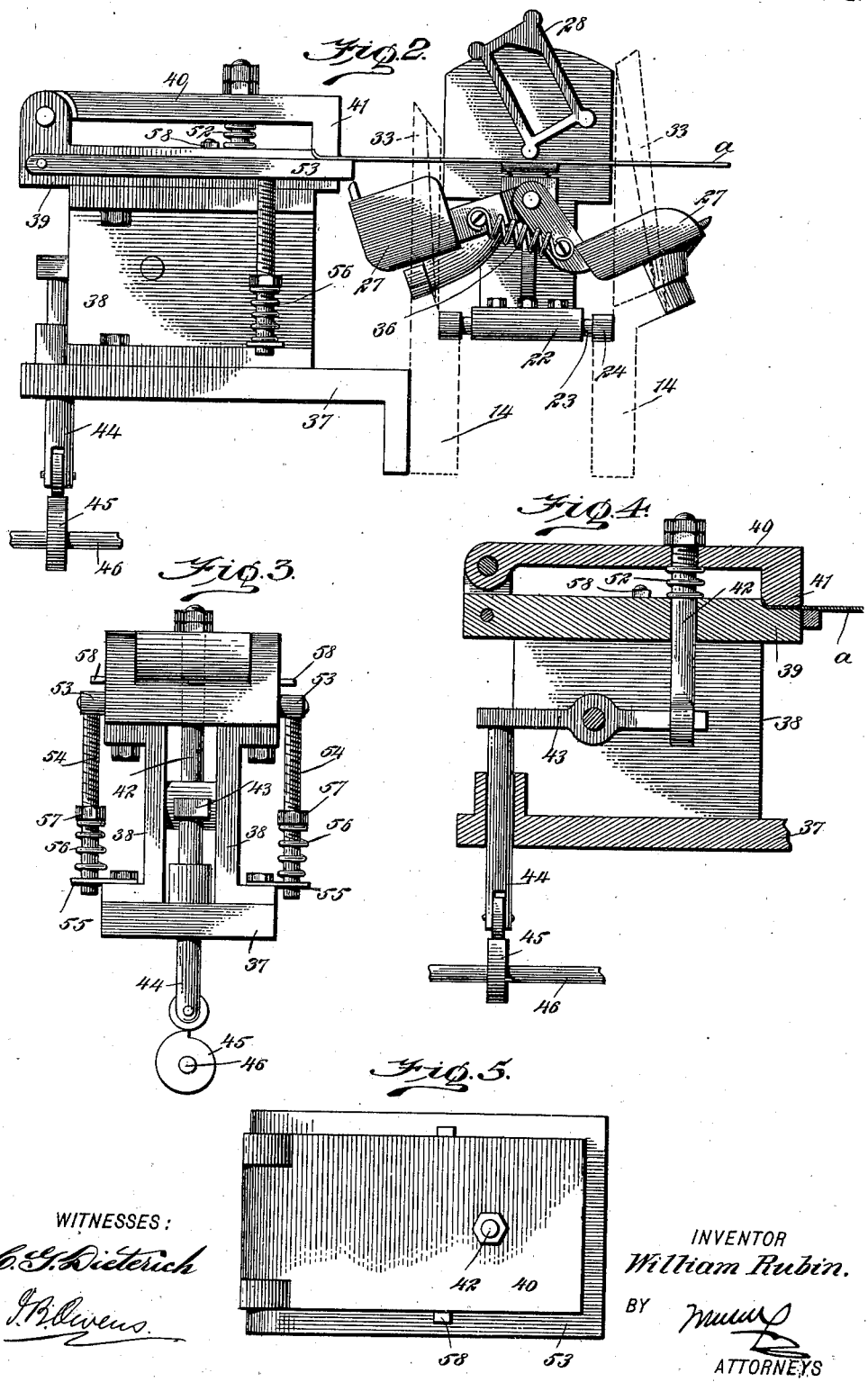

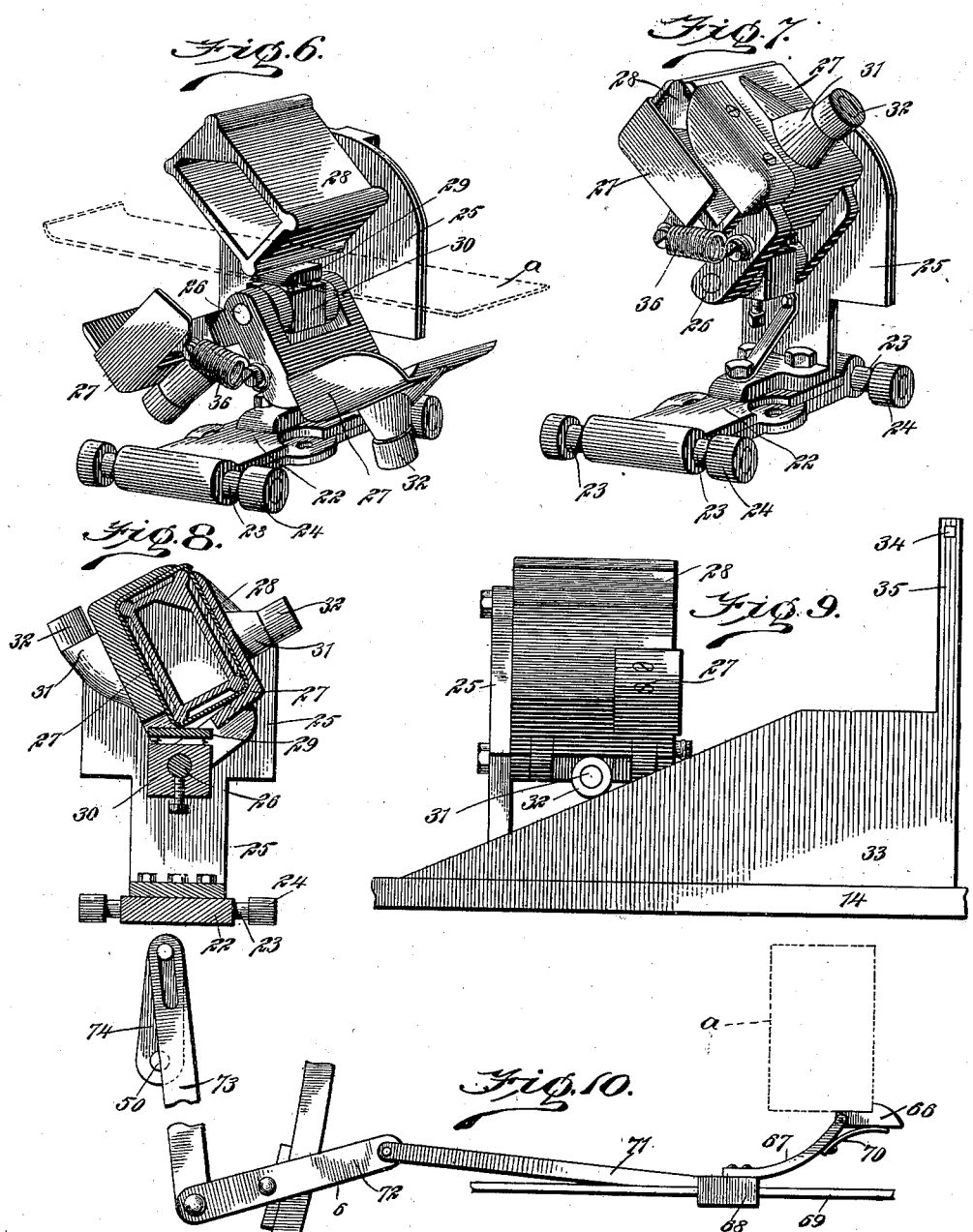

UNITED STATES PATENT OFFICE.

WILLIAM RUBIN, OF OMAHA, NEBRASKA.

CAN FORMING AND SOLDERING MACHINE.

SPECIFICATION forming part of Letters Patent No. 671,237, dated April 2, 1901.

Application filed May 28, 1900. Serial No. 18,273. (No model.)

*To all whom it may concern:*

Be it known that I, WILLIAM RUBIN, a citizen of the United States, and a resident of Omaha, in the county of Douglas and State of Nebraska, have invented a new and Improved Can Forming and Soldering Machine, of which the following is a full, clear, and exact description.

The purpose of this invention is to provide means for forming the bodies of tin cans and for soldering the side seams thereof. To this end the apparatus comprises a number of continuously-moving carriers which shape the blank tin to form the can or box and which form a lap-seam therein, such seam being carried through a solder-bath without interrupting the movement of the carrier, so as to close the seam, and the can being automatically withdrawn from the carrier after the solder has been allowed to set.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a side view of the invention with parts broken away. Fig. 2 is an elevational view showing the blank holder and crimper and the action of the carrier with respect thereto. Fig. 3 is a front view of the blank holder and crimper. Fig. 4 is a vertical section thereof. Fig. 5 is a plan view. Fig. 6 is a perspective view of the carrier in open position, showing the position of the blank by dotted lines. Fig. 7 is a perspective view of the carrier closed. Fig. 8 is a sectional view showing the carrier closed and showing a can therein. Fig. 9 is a side view of the carrier, illustrating its action in connection with the cams for closing the same; and Fig. 10 is a detail view of the ejector which removes the cans from the carrier after they have been soldered.

The machine here shown is designed for forming rectangular cans; but it will be clear to persons skilled in the art that cans of any shape may be formed without departing from the spirit of my invention.

In Fig. 1 I have illustrated a machine having a framing comprising two end columns 11, rigidly connected by tie-bars 12 and sustaining an endless track 14. If desired, intermediate columns, such as the columns 11, may be employed; but I have not deemed it necessary to illustrate them here. Mounted in the columns 11 are shafts 15 and 16, which carry sprocket-wheels 17, and over these sprocket-wheels chains 18 pass. The chains 18 are driven from a drive-shaft 19 through the medium of a pinion 20, fastened thereto and meshing with a spur-gear 21 on the shaft 15. The chains 18 are connected with the carriers, which may be of any desired number spaced apart, according to the form of the machine. Reference to Figs. 6 to 9 will show that the carriers comprise bases 22, with pins 23 projecting therefrom, to which links of the chains 18 are connected. The pins 23 are also provided with rollers 24, which run on the tracks 14. Rigidly supported on the bases 22 of the carriers are back plates 25, to which are fixed stub-shafts 26. On these stub-shafts the folding arms 27 are pivotally mounted, such arms being two in number and being angular in form, as shown in Fig. 8, so that when thrown up to closed position they will inclose the mandrel 28 and bend the blank around the same, as illustrated. The mandrel 28 is carried on the back plate 25. Beneath the mandrel a spring-pressed block 29 is arranged with a beveled front end, such block being supported on a square collar 30, which is fastened to the shaft 26, the block 29 bearing against the lowermost corner of the mandrel 28 for a purpose which will hereinafter appear. The folding arms 27 carry projections 31, on which rollers 32 are mounted, such rollers serving to engage cams 33, which are mounted on the respective tracks 14, as shown in Figs. 1 and 9, and as the rollers 32 ride up the cams 33 the folding arms are thrown into closed position. (See Figs. 7 and 8.) These cams 33 are also illustrated by dotted lines in Fig. 2, which shows the blank engaged with the carrier, but being still held by the blank-holder. When the blank is released from the blank-holder, it drops to the position indicated by dotted lines in Fig. 6, and when the rollers 32 engage the cams 33 the folding arms assume the position shown in Fig. 8, and the blank is formed into a can. If desired, the cams 33 may be connected with each other to render the structure rigid by a transverse rod 34, which passes between extensions 35, running upward from the cams, the height of the rod 34 being sufficient to permit the carriers to move under the rod 34. The folding arms 27 are held either in open or closed position by a retractile spring 36, which is connected at its ends with the respective arms. Fig. 2 illustrates the spring 36 partially extended, which position the spring assumes during the time that the folding arms move from folded to open position.

Immediately ahead of the cams 33 (see Fig. 1) is arranged a device for holding and crimping the blank, such device holding the blank immediately in front of the next advancing carrier, so that it is engaged therewith, and the operating means of the holding device being timed to release the blank, so that the carrier may take the blank on through the other operations of the machine. This holder is shown in Figs. 2, 3, 4, and 5, and comprises a bracket 37, which is fastened to one of the tracks 14 and projects laterally therefrom. This bracket sustains two cheeks 38, at the upper ends of which is fastened a bed 39. On the bed 39 is pivoted a gripper 40, which has its free end located at the inner side of the holding device directly adjacent to the tracks 14, as shown in Fig. 2. This gripper 40 is provided with a downward extension 41, which bears in a recess in the front edge of the bed 39, so that the blank, (indicated at $a$ in the drawings,) when engaged between the parts 41 and 39, will not only be held firmly thereby, but will have its ends crimped or turned upward, so as to enable the formation of a lap-seam, as illustrated in Fig. 8. The gripper 40 is connected with a bolt 42, which extends down through the bed 39 and has connection with a lever 43, fulcrumed between the cheeks 38. This lever is also connected with a reciprocal rod 44, mounted to slide vertically in the bracket 37 and actuated by a cam 45, which is carried on a continuously-revolving shaft 46, and this shaft is driven by a sprocket-wheel 47, fast thereto and around which passes a chain 48, such chain also passing around a sprocket-wheel 49, fastened to a counter-shaft 50, which is driven from a spur-gear 21 through the agency of a pinion 51, fastened to the shaft 50. The blanks are fed manually to the holder, and the operation of the cam 45 is so timed that the instant that each carrier passes the holder the gripper 40 will be raised, so that a new blank may be introduced therein, and then the cam operates to throw the gripper down, thus holding the blank and crimping the same. As the next carrier advances the carrier moves against the blank, so as to engage the blank between the lowermost edge of the mandrel 28 and the beveled front end of the spring-pressed block 29, and the instant that the blank is in this position (see dotted lines in Fig. 6) the cam acts to release the gripper 40. The gripper 40 is thrown up by an expansive spring 52, which encircles the bolt 42 and bears between the bed 39 and gripper 40. For assisting in the disengagement of the blank from the holder I provide a U-shaped ejector 53, which is pivoted to the outer portion of the bed 39 and extends around the side and front edges thereof beneath the blank. This ejector 53 is connected at each side with bolts 54, which pass down and have their lower ends arranged in guides 55, carried by the bracket 37. Expansive springs 56 encircle the bolts 54 and bear against the guides 55 and against nuts 57, fastened to the bolts, whereby to throw upward the ejector 53. When the gripper 40 is raised, the springs 56 are permitted to assert themselves and the ejector 53 is thrown up, thus disengaging the blank from the holder. The upward movement of the ejector 53 is limited by a transverse bar 58, which is arranged on top of the bed 39.

It having been now described that the blanks are placed in the holder and are automatically crimped thereby and then taken by the carriers and formed into cans, reference to Fig. 1 will show that the carriers move around the tracks 14 and pass down to the under side of the machine. A liquid flux may be applied to the seams by any desired means, which, not entering into my invention, I have not here illustrated. At the under side of the machine a solder-pan 59 is arranged. This pan may be heated by any desired means, (not shown,) and drops $14^a$ in the tracks 14 cause the carriers to descend into the solder, so that the seams are given a bath therein. The seams move through this bath and are then raised out of the same and continue with the movement of the machine. Brushes 60 are provided for engaging the seams of the cans, and these brushes are arranged at each end of the pan 59, being arranged to move in unison by a chain 61, passing around sprocket-wheels on the axes of the brushes. The brushes are driven by a sprocket-chain 62, which passes from a sprocket-wheel on the shaft 16. As the carriers move beyond the solder-pan the solder which has been applied to the seams of the cans will be allowed to set, and for the purpose of assisting the springs 36 in holding the folding arms in closed position I provide spring guide-bars 63, which are adapted to bear on the folding arms and which are sustained from the tracks 14 by hangers 64 or other suitable means, all of which is illustrated in Fig. 1. As the carriers move beyond the spring-bars 63 the rollers 32 are engaged with inclined or cam-like ways 65, which serve to throw the folding arms upward and disengage them from the cams. The cans are now thrown off of the mandrels 28 by means of a dog 66. (See Figs. 1 and 10.) This dog 66 is pivoted on an arm 67, fastened rigidly to a sleeve 68, which slides on a rigid guide-bar 69. A spring 70 engages the dog 66 to hold the same in operative position. The sleeve 68 is reciprocally driven by a link 71, which is pivoted thereto and to a lever 72.

This lever is fulcrumed on the base portion of the left-hand column 11 (see Fig. 1) and is driven by a link 73, which has a slotted end engaged by the wrist-pin of a crank 74, fastened to and actuated by the shaft 50. These parts are timed, so that as each carrier approaches the dog 66 is caused to engage the can and jerk the same off of the mandrel, thus throwing the can down from the machine.

Reference to the drawings, particularly Fig. 6, will show that the mandrel projects beyond the plate 25, and therefore the dog 66 will not interfere with this plate.

In connection with this machine it will be observed that the carriers move continuously throughout the various operations of the machine. The blanks are manually fed to the machine, and this is the only manual labor necessary to the formation of the can-body, since the machine automatically crimps and folds the blanks, seals the seams, and ejects the finished product. It will of course be understood that the tops and bottoms of the cans are yet to be applied, which work is not performed by this apparatus. It is pointed out that the machine may be used simply for soldering the cans and, if desired, the folding arms need not be made to operate, in which case an attendant will place the cans on the mandrels and the cams 33 and other parts incident thereto may be dispensed with. It is also obvious that the forms of the mandrels and folding arms may be varied to change the form of the can constructed.

Having thus described my invention, I claim as new and desire to secure by Letters Patent—

1. A can-forming machine, having a continuously-moving carrier or carriers adapted to sustain the cans, solder-containing devices past which the carriers move to bathe the seams of the cans in the solder, and an ejector geared with the can-carrier and working to throw the cans off of the carriers as the carriers move past the ejector without interrupting the movements of the carriers.

2. A can-forming machine, comprising the combination of a blank-holder serving to grip the blank, a carrier having means for shaping the blank to form a can, the carrier moving uninterruptedly past the blank-holder to receive the blank therefrom, and means geared with the carrier to actuate the blank-holder to release the blank as it is engaged by the carrier.

3. In a can-forming machine, the combination of a blank-holder arranged to crimp one edge of the blank, and a carrier moving past the blank-holder to receive the blank therefrom, the carrier having means for bending the blank to form a can and overlapping the edges of the blank to produce a lap-seam.

4. In a can-forming machine, the combination of a blank-holder having a gripper to engage and hold the blank, a carrier having means for bending the blank to form a can, the carrier moving uninterruptedly past the blank-holder to receive the blank therefrom, and means for driving the carrier and for actuating the gripper of the blank-holder to release the blank as the carrier engages the same.

5. A can-forming machine, having a blank-holder comprising a bed, a gripper mounted thereon, a bolt connected with the gripper, a spring serving to throw the gripper away from the bed, and means connected with the bolt to move the gripper into closed position against the tendency of the spring.

6. A can-ejecting device for can-forming machines, comprising a reciprocal sleeve, a dog carried thereby and serving to engage the can, and a link-and-lever mechanism for driving the sleeve to periodically actuate the dog.

7. A can-forming machine having a blank-holder comprising a gripper engaging the blank to crimp the same simultaneously with the holding thereof, a can-carrier with means for forming the blank into a can, the carrier moving past the holder to receive the blank therefrom, and devices for actuating the holder to release the blank upon the engagement of the carrier therewith, such devices being geared to work in time with the carrier.

8. A can-forming machine having a blank-holder, a carrier arranged to take the blank from the holder, means geared to work in time with the carrier for releasing the blank-holder upon the engagement of the carrier with the blank, and an ejector bearing against the blank when it is in the blank-holder, to assist in the release of the blank when the pressure of the blank-holder thereon is relaxed.

9. A can-forming machine having a blank-holder, a can-carrier with means for forming the blank into a can, the carrier moving uninterruptedly past the holder to receive the blank therefrom, and devices for actuating the holder to release the blank upon engagement of the carrier therewith, such devices being geared to work in time with the carrier.

10. In a can-soldering machine, the combination of a carrier, comprising folding arms and a mandrel, said arms being adapted to hold the can on the mandrel with its edges engaged to form a lap-seam, an endless track on which the carrier runs, said track having a dip therein, means for moving the carrier continuously along the track, and a solder-containing device arranged immediately below the dip in the track, so that as the carrier moves down into said dip, the seam of the can is submerged in the solder-bath.

In testimony whereof I have signed my name to this specification in the presence of two subscribing witnesses.

WILLIAM RUBIN.

Witnesses:
FRANK FLANAGAN,
FRANK JOHNSON.